United States Patent
Zhong et al.

(10) Patent No.: US 10,691,768 B2
(45) Date of Patent: Jun. 23, 2020

(54) METHOD AND APPARATUS FOR PROVIDING INFORMATION BASED ON WEBPAGE

(71) Applicant: SAMSUNG ELECTRONICS CO., LTD., Suwon-si (KR)

(72) Inventors: Man Zhong, Nanjing (CN); Ge Zhu, Nanjing (CN); Qiang Gao, Nanjing (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/574,567

(22) PCT Filed: May 16, 2016

(86) PCT No.: PCT/KR2016/005171
§ 371 (c)(1),
(2) Date: Nov. 16, 2017

(87) PCT Pub. No.: WO2016/190584
PCT Pub. Date: Dec. 1, 2016

(65) Prior Publication Data
US 2018/0157765 A1      Jun. 7, 2018

(30) Foreign Application Priority Data

May 25, 2015   (CN) .......................... 2015 1 0284188
May 13, 2016   (KR) ....................... 10-2016-0058767

(51) Int. Cl.
*G06F 17/00*   (2019.01)
*G06F 16/957*  (2019.01)
(Continued)

(52) U.S. Cl.
CPC ........ *G06F 16/9577* (2019.01); *G06F 40/103* (2020.01); *G06F 40/117* (2020.01);
(Continued)

(58) Field of Classification Search
CPC ............ G06F 17/211; G06F 17/30905; G06F 17/2294; G06Q 30/0277
See application file for complete search history.

(56) References Cited

U.S. PATENT DOCUMENTS 8,577,181 B1    11/2013  Badros et al.
2003/0128234 A1*  7/2003  Brown ...................... G06F 3/14
                                                    715/744
(Continued)

FOREIGN PATENT DOCUMENTS

CN    102214240 A    10/2011
CN    102880439 A     1/2013
(Continued)

OTHER PUBLICATIONS

PageSense : Style-wise Web Page Advertising, by Li et al, Apr. 26, 2010, International World Wide Web Conference Committee, 4 pages.*

(Continued)

*Primary Examiner* — Scott T Baderman
*Assistant Examiner* — Barbara M Level
(74) *Attorney, Agent, or Firm* — Sughrue Mion, PLLC

(57) ABSTRACT

Provided are a method and an apparatus for providing various information based on a web page with improved space utilization of the web page. The information providing apparatus may include a processor configured to detect at least one blank area included in a web page, detect target data having a size matching size information regarding the at least one blank area, and push the target data to the at least one blank area by using position information regarding the at least one blank area, thereby displaying the web page and the target data together.

14 Claims, 9 Drawing Sheets

(51) Int. Cl.
*G06F 40/103* (2020.01)
*G06F 40/117* (2020.01)
*G06F 40/131* (2020.01)
*G06F 40/163* (2020.01)
*G06Q 30/02* (2012.01)

(52) U.S. Cl.
CPC .......... *G06F 40/131* (2020.01); *G06F 40/163* (2020.01); *G06Q 30/0277* (2013.01)

(56) References Cited

U.S. PATENT DOCUMENTS

| | | | |
|---|---|---|---|
| 2006/0212353 | A1 | 9/2006 | Roslov et al. |
| 2008/0306815 | A1 | 12/2008 | Dykes et al. |
| 2008/0306824 | A1* | 12/2008 | Parkinson .............. G06Q 30/02 705/14.73 |
| 2009/0083140 | A1* | 3/2009 | Phan ....................... G06Q 30/02 705/14.52 |
| 2009/0112724 | A1 | 4/2009 | Joo |
| 2009/0327076 | A1 | 12/2009 | Sinyagin et al. |
| 2010/0070351 | A1 | 3/2010 | Kang |
| 2010/0211464 | A1 | 8/2010 | Zhu et al. |
| 2011/0035281 | A1 | 2/2011 | Bernstein et al. |
| 2013/0332308 | A1* | 12/2013 | Linden ............... G06Q 30/0631 705/26.7 |
| 2015/0019958 | A1* | 1/2015 | Ying ..................... G06F 17/211 715/243 |
| 2015/0088669 | A1 | 3/2015 | Kwak |

FOREIGN PATENT DOCUMENTS

| | | |
|---|---|---|
| EP | 2 015 245 A1 * | 1/2009 |
| JP | 2006-72750 A | 3/2006 |
| KR | 10-2005-0046326 A | 5/2005 |
| KR | 10-2007-0072673 A | 7/2007 |
| KR | 10-2007-0114061 A | 11/2007 |
| KR | 10-2008-0107248 A | 12/2008 |
| KR | 10-2009-0045521 A | 5/2009 |
| KR | 10-2009-0107898 A | 10/2009 |
| KR | 10-2012-0101217 A | 9/2012 |
| WO | 2013055941 A1 | 4/2013 |
| WO | 2014/027773 A1 | 2/2014 |

OTHER PUBLICATIONS

How Browsers Work: Behind the scenes of modern web browsers—HTML5 Rocks, by Tali Garsiel and Paul Irish, published Aug. 5, 2011, 52 pages, retrieved from https://www.html5rocks.com/tutorials/internals/howbrowserswork/.*
Communication dated Sep. 1, 2017 by the State Intellectual Property Office of P.R. China in counterpart Chinese Patent Application No. 201510284188.1.
Communication dated Aug. 31, 2016 by the International Searching Authority in counterpart International Patent Application No. PCT/KR2016/005171. (PCT/ISA/210).
Communication dated Aug. 31, 2016 by the International Searching Authority in counterpart International Patent Application No. PCT/KR2016/005171. (PCT/ISA/237).
Communication dated May 4, 2018, issued by the European Patent Office in counterpart European Application No. 16800224.4.
Li et al., "PageSense: Style-wise Web Page Advertising", Apr. 26, 2010, Proceedings of the 19th International Conference on World Wide Web, XP058297336, 4 pages total.
Communication dated May 7, 2019, issued by the European Patent Office in counterpart European Application No. 16800224.4.

* cited by examiner

FIG. 9
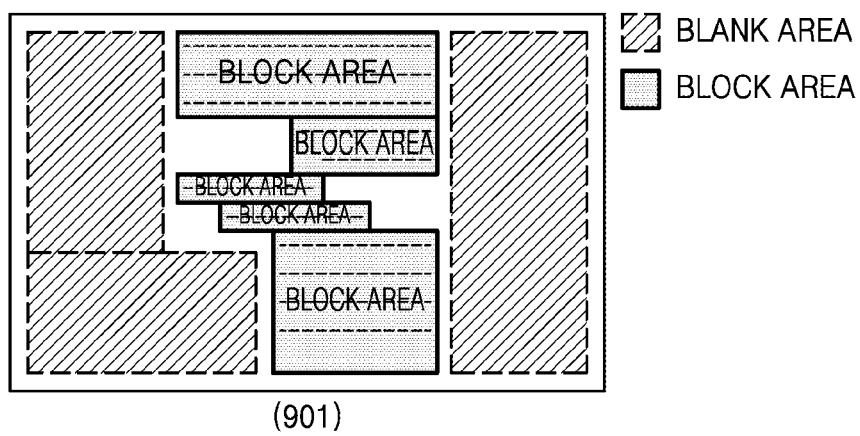
(901)
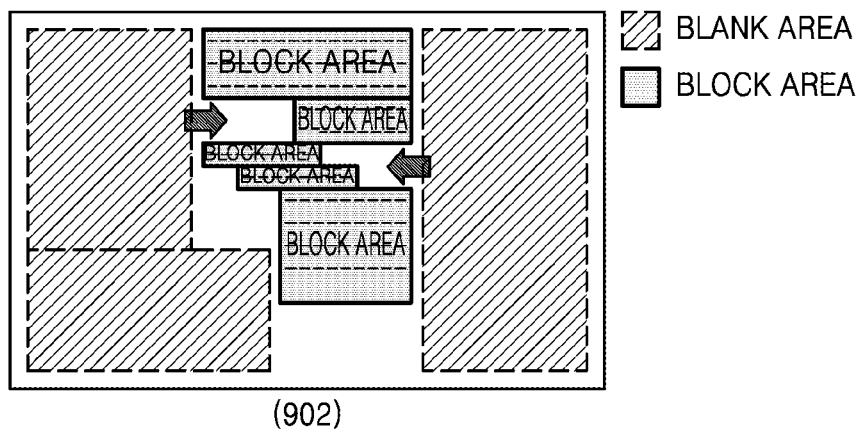
(902)

METHOD AND APPARATUS FOR PROVIDING INFORMATION BASED ON WEBPAGE

TECHNICAL FIELD

The present invention relates to an information providing technique, and more particularly, to a method and an apparatus for providing information based on a web page.

BACKGROUND ART

With the rapid development of display device technologies, the use of high resolution display devices is increasing. However, as the resolution of a display device increases, blank areas that are not used in a web page displayed by the display device increase, and thus display space utilization may be lowered. Furthermore, information provided via a web page is limited to information provided by a web site.

DETAILED DESCRIPTION OF THE INVENTION

Technical Problem

Therefore, a technique capable of providing various information based on a web page while improving the space utilization of a web page displayed on a display device is necessary.

Technical Solution

Embodiments of the present disclosure provide a method and apparatus for providing various information while effectively improving the space utilization of a displayed web page by using a blank area of the displayed web page.

Advantageous Effects of the Invention

According to embodiments of the present disclosure, various information may be provided while effectively improving the space utilization of a displayed web page by using a blank area of the displayed web page.

DESCRIPTION OF THE DRAWINGS

FIG. 9 is a diagram showing an example of reducing a size of a block area included in a web page and enlarging a detected blank area, by an apparatus (100) according to an embodiment of the present disclosure.

BEST MODE

Figure 1:
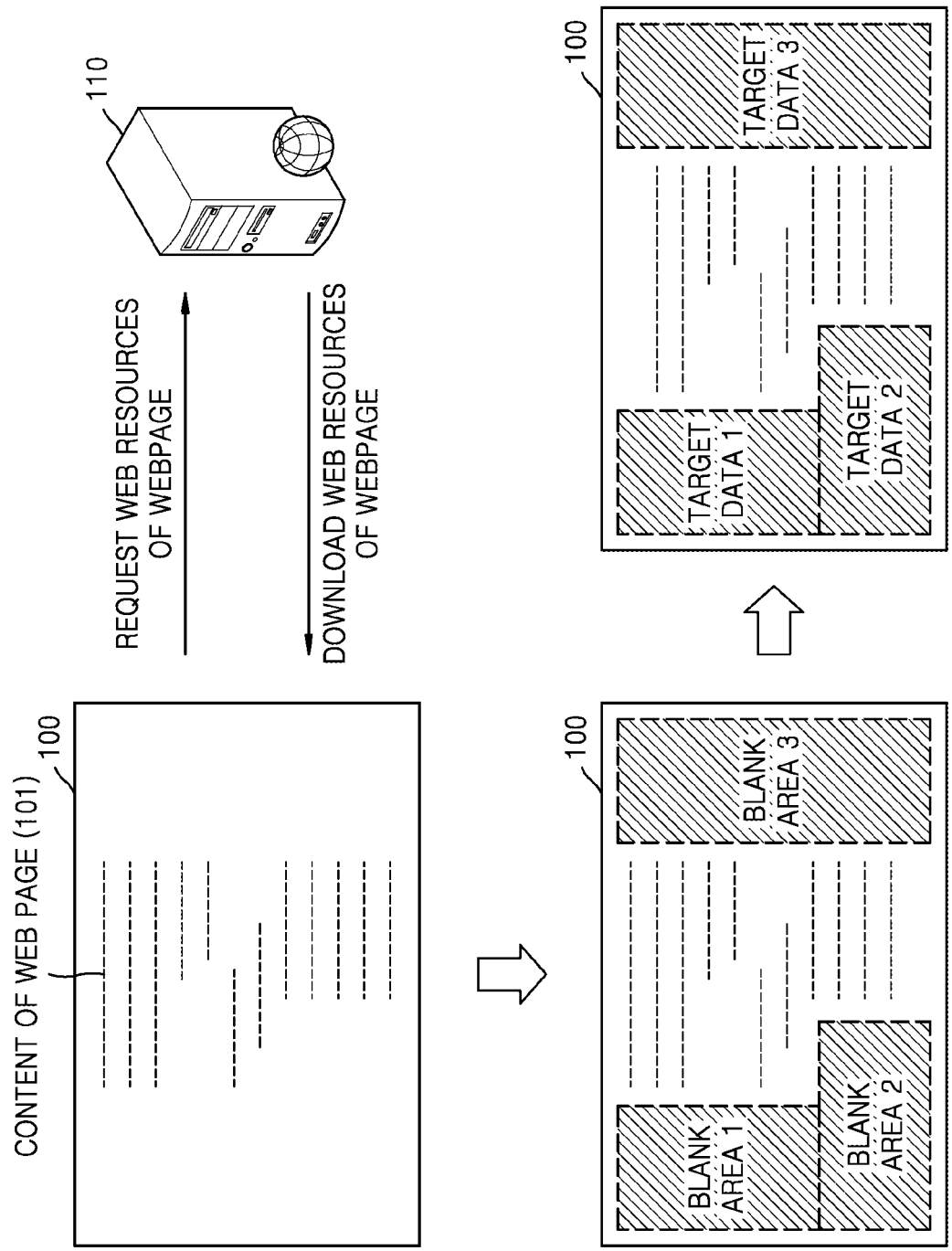
FIG. 1 is a schematic diagram showing a method of providing information by an apparatus according to an embodiment of the present disclosure.

According to a first aspect of the present disclosure, there is provided an information providing apparatus including a display configured to display a web page; and a processor configured to detect at least one blank area included in the web page, detect target data having a size matching size information regarding the at least one blank area, and push the target data to the at least one blank area by using position information regarding the at least one blank area, thereby displaying the web page and the target data together.

According to a second aspect of the present disclosure, there is provided a method by which an apparatus including a display provides information, the method including detecting at least one blank area included in a web page being displayed on the display; detecting target data having a size matching size information regarding the at least one blank area; and displaying the web page and the target data together by pushing the target data to the at least one blank area by using position information regarding the at least one blank area.

According to a third aspect of the present disclosure, there is provided a non-transitory computer-readable recording medium having recorded thereon a computer program for implementing the method according to the second aspect.

Mode of the Invention

Hereinafter, exemplary embodiments will be described more fully with reference to the accompanying drawings. This exemplary embodiments may, however, be embodied in many different forms and should not be construed as limited to the exemplary embodiments set forth herein. Rather, the exemplary embodiments are provided so that this disclosure will be thorough and complete, and will fully convey the scope of the present disclosure to those skilled in the art. In drawings, certain elements are omitted for clarity, and like elements denote like reference numerals throughout the specification.

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, appearance of new technology, and the like.

While such terms as "first," "second," etc., may be used to describe various components, such components must not be limited to the above terms. The above terms are used only to distinguish one component from another.

The terms used in the present disclosure are merely used to describe particular embodiments, and are not intended to limit the present disclosure. An expression used in the singular encompasses the expression of the plural, unless it has a clearly different meaning in the context. Throughout the present disclosure, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

The use of the terms "a" and "an" and "the" and similar referents in the context of describing the present disclosure (especially in the context of the following claims) are to be construed to cover both the singular and the plural. Also, the steps of all methods described herein can be performed in any suitable order unless otherwise indicated herein or otherwise clearly contradicted by context. The present disclosure is not limited to the described order of the steps.

Appearances of the phrases 'in some embodiments,' 'in certain embodiments,' in various embodiments,' and similar language throughout this specification may, but do not necessarily, all refer to the same embodiment, but mean 'one or more but not all embodiments' unless expressly specified otherwise.

The present disclosure may be described in terms of functional block components and various processing steps. Such functional blocks may be realized by any number of hardware and/or software components configured to perform the specified functions. For example, the functional blocks of the present disclosure may be realized one or more microprocessors or circuit components for a predetermined function. Furthermore, for example, the functional blocks of the present disclosure may be implemented with various programming or scripting language. Functional aspects may be implemented in algorithms that are executed on one or more processors. Functional aspects or operation of the present disclosure may be implemented by executing a software program stored in an apparatus by one or more processors included in the apparatus. Furthermore, the present disclosure could employ any number of conventional techniques for electronics configuration, signal processing and/or data processing and the like. The words "mechanism", "element", "means", and "configuration" are used broadly and are not limited to mechanical or physical embodiments.

The present disclosure will be described below in detail with reference to the attached drawings.

FIG. 1 is a schematic diagram showing a method of providing information by an apparatus 100 according to an embodiment of the present disclosure.

Referring to FIG. 1, when information regarding a web site (e.g., a web site address) is input by a user, the apparatus 100 requests web resources of the web page from a server 110 corresponding to the web site. Web resources of a web page may be referred to as resources of the web page. The apparatus 100 downloads the web resources of the web page from the server 110 according to the web resources request of the web page. The web resources of the web page may include all content rendered by the apparatus 100. The web resources of the web page may include, for example, cascading style sheet (CCS) web resources, script web resources, data XML web resources, and/or image web resources. However, according to the present disclosure, web resources of a web page are not limited thereto.

The apparatus 100 parses the downloaded web resources of the web page. The apparatus 100 lays out each component included in the web page by using a parsed result. At this time, the apparatus 100 may obtain position information and size information regarding each component included in the web page. According to the present disclosure, size information may be represented by length data and width data, but is not limited thereto. For example, the size information may be represented by length data, width data, and height data.

When the layout of each component is completed, the apparatus 100 renders content 101 of the web page and displays the rendered content 101 on a display. Therefore, a user may view the content 101 of the web page via the apparatus 100.

As described above, in order to display the content 101 of the web page based on bidirectional communication between the apparatus 100 and the server 110, the apparatus 100 may be operated by application software (or a browser engine), such as a web browser.

The apparatus 100 may include a high resolution display. The apparatus 100 may be, for example, a TV that includes a 4K (Kilo pixel) resolution display, but apparatus 100 according to the present disclosure is not limited thereto.

When the apparatus 100 includes a high resolution display, the user may view many blank areas in the web page being displayed on the apparatus 100. According to the present disclosure, a blank area may not only refer to a white space in the web page being displayed on the apparatus 100, but also include all unused areas.

The all unused areas in a web page may indicate an area excluding a display area or a block area of a valid component included in the web page as described below. A blank area may be any area excluding invalid areas from among areas that are not used in a web page. An area excluding invalid areas from among areas that are not used in a web page may include, but is not limited to, an area having a size that is difficult to push target data as described below. Information provided by the apparatus 100 according to the present disclosure may include information provided via a blank area.

The apparatus 100 may detect at least one blank area included in a web page according to layout information regarding each component included in the web page. The apparatus 100 may detect a blank area of a web page according to minimum size information (or information regarding a minimum length and a minimum width) regarding a pre-set blank area. For example, the apparatus 100 may detect a blank area having a size larger than that indicated by minimum size information regarding a pre-set blank area, but the present disclosure is not limited thereto. For example, the apparatus 100 may detect all blank areas included in a web page. In FIG. 1, the apparatus 100 detects three blank areas (e.g., blank area 1, blank area 2, and blank area 3) in the web page.

The apparatus 100 may provide information according to the present disclosure via a detected blank area of a web page by using size information and position information regarding the detected blank area. Information according to the present disclosure may include various value-added services. The various value-added services may include, for example, advertisements (ADs), recommendation services, device-carried function data, user-self-defined data, open application programming interfaces (APIs) for a third-party service, but value-added services according to the present disclosure are not limited thereto. Examples of the above-described various value-added services may be classified by value-added service types.

In order to provide an AD via a blank area, the apparatus 100 or an external device connected to the apparatus 100 may store at least one AD, size information and a keyword regarding the at least one AD. The keyword may be referred to as a value-added service index. The at least one AD may include a user-customized AD. The at least one AD may include a public AD. The external device may be connected to the apparatus 100 via a wire or wirelessly. The external device may be a database-based device. For example, the external device may be a storage medium or an Internet-based database server.

In order to provide a recommended service via a blank area, the apparatus 100 or an external device connected to the apparatus 100 may store at least one recommended service and size information and a keyword regarding the at least one recommended service. The at least one recommendation service may include a recommended service related to content of a web page being displayed on the apparatus 100.

In order to provide device-executable function data via the blank area, the apparatus 100 or an external device connected to the apparatus 100 may include size information regarding a blank area for providing the device-executable function data and at least one piece of device-executable function data.

When the apparatus 100 detects a blank area in a web page and size information regarding the detected blank area does not have a size for providing the device-executable function data, the apparatus 100 may combine a plurality of detected blank areas with one another or enlarge the detected blank area. In order to combine the plurality of detected blank areas to one another or to enlarge the detected blank area, the apparatus 100 may rearrange valid components or block areas included in the web page. For example, when the apparatus is a TV, device-executable function data that may be provided via a blank area may include playing a TV show, starting another application program, displaying video, etc.

In order to provide user-self-defined data via a blank area, the apparatus 100 or an external device connected to the apparatus 100 may include at least one keyword (e.g., a title, a tag, a search keyword, etc.) obtained by taking a user's behavior into account when the user browses the internet and data corresponding thereto and/or at least one keyword input by the user and data corresponding thereto.

Every time the apparatus 100 browses a new web page or reloads a web page, the apparatus 100 may collect or update a keyword obtained by taking a user's behavior into account and data related thereto. In order to obtain a keyword by taking a user's behavior into account, the apparatus 100 may, for example, detect a bookmark, detect a favorite, and/or detect a search history. Operations of the apparatus 100 for obtaining a keyword by taking a user's behavior into account according to the present disclosure are not limited thereto. In order for a user to input a keyword, the apparatus 100 may provide a textbox or checkbox via a display. A user may enter a keyword based on a voice and/or gesture of the user.

In order to provide an open application programming interface (API) for a third-party service via a blank area, the apparatus 100 or an external device connected to the apparatus 100 may store information regarding at least one open API for a third-party service, size information, and a keyword.

The apparatus 100 may intelligently push various value-added services to a blank area by using the size information or/and the keyword. The various value-added services described above may refer to target data for a user of the apparatus 100. For convenience of explanation, various value-added services will be referred to as target data.

Target data provided via a blank area may be determined based on size information regarding the blank area. Target data provided via the blank area may be determined according to a keyword regarding the blank area and/or a personal keyword. A keyword regarding a blank area may be determined according to a keyword regarding a component included in a web page near the blank area or a keyword of block area near the blank area. A personal keyword may include at least one of user's behavior information regarding a user's behavior when the user browses a web page and a keyword input by the user. The user's behavior information may include a keyword obtained by taking the above-stated user's behavior into account.

Target data provided via a blank area may be determined according to a type set by a user (or a type of a value-added service). For example, when a user sets a use-self-defined data type, the apparatus 100 may provide only user-self-defined data via the blank area. For example, when a user sets up an AD, the apparatus 100 may only provide ADs via the blank area.

When target data having a size matching size information regarding a blank area is detected, the apparatus 100 may push the detected target data to the blank area by using position information regarding the detected blank area.

Furthermore, when target data having a size matching size information regarding a blank area is detected, the apparatus 100 may determine whether the target data is appropriate as target data for the blank area based on a similarity between a keyword regarding the target data and a pre-set keyword. A pre-set keyword may include a keyword regarding the above-stated blank area and/or a personal keyword. When the detected target data is determined to be appropriate as the target data of the blank area, the apparatus 100 may push the target data to the blank area.

As the target data is pushed to the blank area, a user may view target data 1, target data 2, target data 3, and the content 101 of the web page via a display of the apparatus 100 as shown in FIG. 1 together. The target data 1, the target data 2, and the target data 3 may be data different from one another. The target data 1, the target data 2, and the target data 3 may be different types of value-added services.

As described above, the present disclosure may provide various value-added services together by using a blank area of a web page without interfering with a user from viewing content of a desired web page. Therefore, according to the present disclosure, space utilization of a web page may be effectively improved and various value-added services may be provided via a blank area. Furthermore, according to the present disclosure, various commercial values may be created, e.g., providing various incentives to a user based on times and frequencies of using value-added services provided via a blank area.

Figure 2:
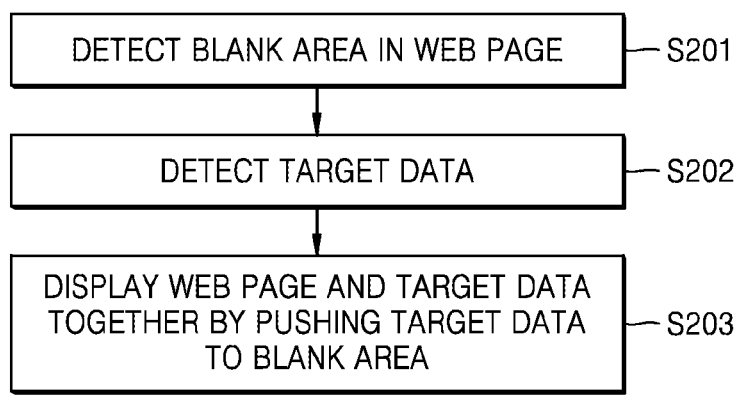
FIG. 2 is a flowchart of a method of providing information performed by an apparatus according to an embodiment of the present disclosure.

FIG. 2 is a flowchart of a method of providing information, performed by the apparatus 100, according to an embodiment of the present disclosure.

Referring to FIG. 2, in operation S201, the apparatus 100 detects at least one blank area included in a web page received from the server 110.

The apparatus 100 may search for all components of the web page and detect a display area other than display areas of valid components included in the web page as a blank area. At this time, the apparatus 100 may detect a blank area that satisfies a pre-set size requirement.

Valid components included in a web page may include operation components, text components, and/or picture components. The apparatus 100 may mark valid components included in a web page and mark components other than the above-stated valid components as invalid components. Generally, invalid components may include background components, components having repeated attributes, and components having a pure color attribute, such as white, but invalid components according to the present disclosure are not limited thereto. For example, invalid components according to the present disclosure may include a valid component that is covered by another valid component.

Tags of valid components included in a web page may include, for example, <button>, <video>, <img>, <input>, <audio>, <canvas>, or/and <textarea>, but tags of valid components included in a web page according to the present disclosure are not limited thereto. Tags of invalid components included in a web page may include, for example, <head>, <br>, <div>, <title>, and/or <address>, but tags of invalid components included in a web page according to the present disclosure are not limited thereto.

Figure 3:
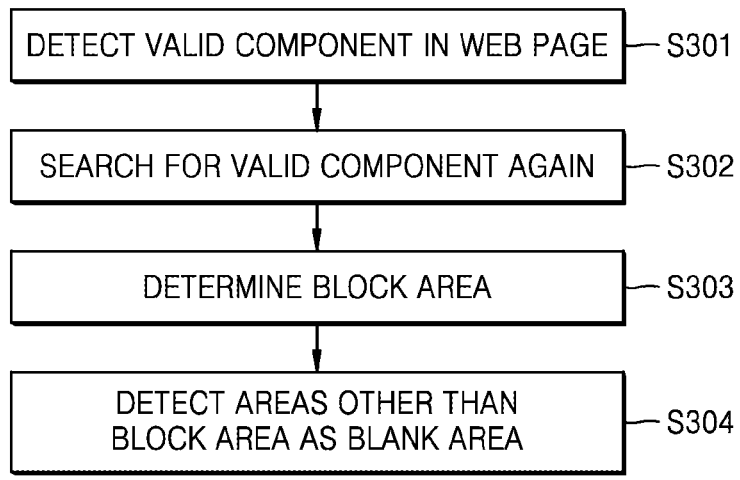
FIG. 3 is a detailed flowchart of an operation for detecting a blank area of a web page by an apparatus according to an embodiment of the present disclosure.

FIG. 3 is a detailed flowchart of an operation for detecting a blank area of a web page by an apparatus 100 according to an embodiment of the present disclosure.

Referring to FIG. 3, in operation S301, the apparatus 100 searches for all components in a web page. While searching for all components, the apparatus 100 detects an operation component, a text component, and/or a picture component included in the web page as a valid component. The apparatus 100 may detect the above-stated valid components in the web page by using a CCS attribute.

In operation S302, the apparatus 100 searches for valid components again. From among the valid components, the apparatus 100 may mark a component covered by another valid component, a repeated image component, an image component including invalid information, and an image component having a background attribute as invalid components. An image component including invalid information may include a component having a pure color attribute, such as white.

In operation S302, the apparatus 100 may detect a keyword regarding a valid component from attributes of the valid component. The apparatus 100 may detect a keyword regarding a valid component from an identifier (ID) attribute of the valid component, a name attribute of the valid component, a source attribute of the valid component, a context attribute of the valid component, and/or a content attribute of the valid component. A keyword regarding a valid component may be used as a keyword regarding an adjacent blank area.

In operation S303, the apparatus 100 determines a block area. The apparatus 100 may perform boundary checking on valid components detected in operation S302. In operation S303, the apparatus 100 may determine the block area by combining the valid components according to a result of the boundary checking. The apparatus 100 may determine a block area by using position information and size information regarding each component. The apparatus 100 may obtain a keyword regarding a block area by using keywords regarding a valid component included in the block area. The keyword regarding the block area may be used as a keyword regarding an adjacent blank area.

In operation S304, the apparatus 100 may detect an area excluding the block area as a blank area of the web page. The apparatus 100 may detect a blank area by scanning the web page along the x-axis based on size information and position information regarding the detected block area and re-detect a blank area by scanning the web page along the y-axis. When scanning a web page, the apparatus 100 may consider some blank areas as areas to be ignored. The areas to be ignored may include an area having a size that is not suitable for pushing target data.

In order to determine an area to be ignored, the apparatus 100 may determine whether a length and a width of a blank area are greater than those indicated by pre-set minimum length information and pre-set minimum width information. When the length and width of the blank area are smaller than those indicated by the pre-set minimum length information and the pre-set minimum width information, the apparatus 100 may determine the detected blank area as an area to be ignored.

When the number of detected blank areas is greater than a pre-set number, the apparatus 100 may determine blank areas having relatively small sizes as areas to be ignored.

The apparatus 100 obtains average size information regarding an average size of detected blank areas and, when a size of a detected blank area is smaller than that of the average size information, the apparatus 100 may determine the detected blank area as an area to be ignored.

As described above, according to the present disclosure, a blank area of a web page may be dynamically detected. In order to dynamically detect a blank area of a web page, the apparatus 100 may store condition information regarding conditions for dynamic detection in advance. The condition information may include information regarding information to be provided via the blank area (e.g., information type or value-added service type) or reference size information (e.g., minimum size information regarding the blank area or average size information regarding the blank area). To dynamically detect a blank area of a web page, the apparatus 100 may provide guidance information every time a blank area is detected. The guidance information may include information for a user to set conditions for detecting a blank area.

Figure 4:
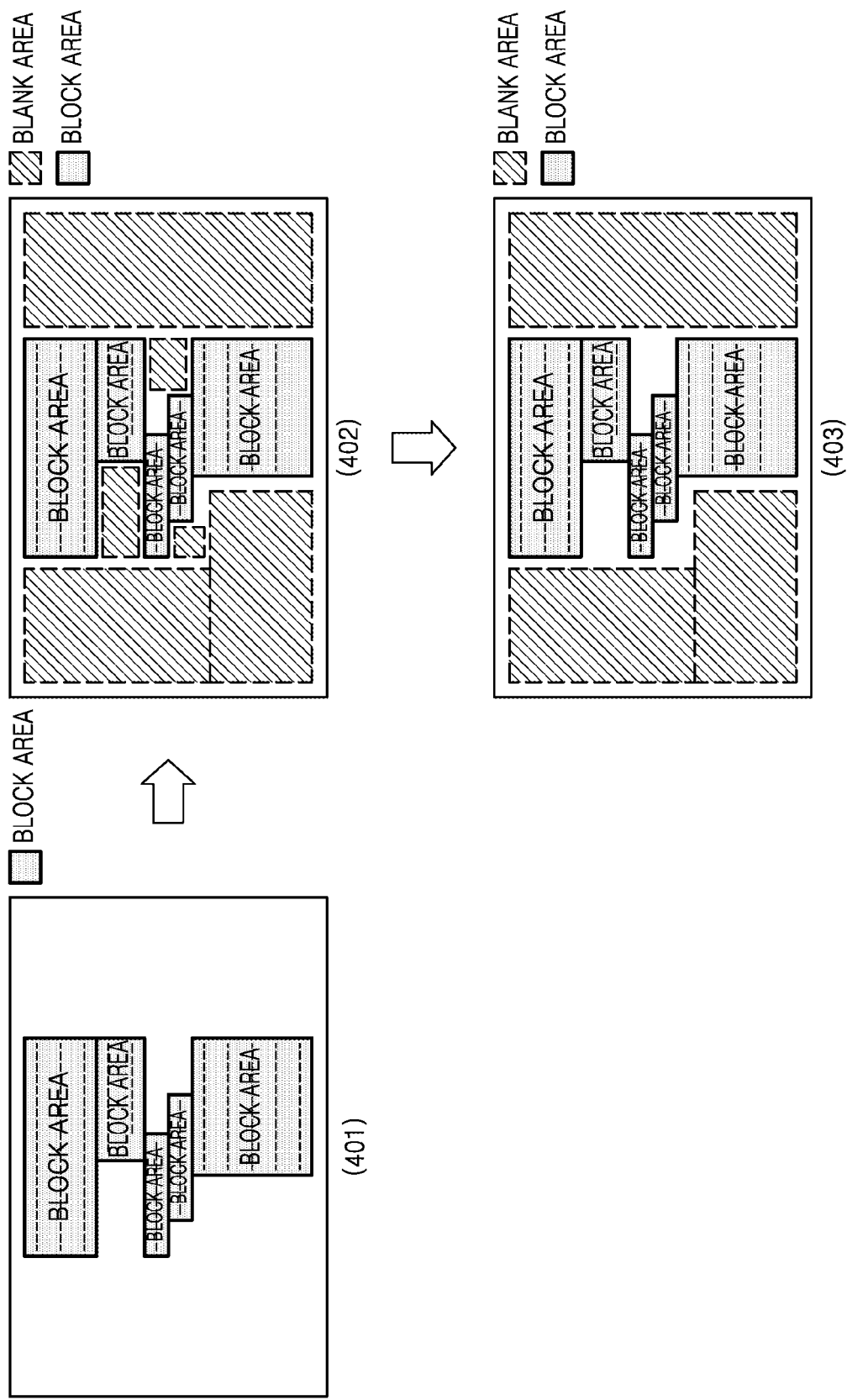
FIG. 4 is a diagram showing an example of detecting a block area detected on a web page by an apparatus according to an embodiment of the present disclosure and a blank area.

FIG. 4 is a diagram showing an example of detecting a blank area and a block area detected on a web page by the apparatus 100 according to an embodiment of the present disclosure. When a block area included in the web page is detected in operation 401 of FIG. 4, the apparatus 100 may detect areas excluding the block area as blank areas in operation 402 of FIG. 4. In operation 403 of FIG. 4, the apparatus 100 may exclude blank areas having sizes smaller than that of pre-set minimum size information from among the blank areas detected in operation 402 described above.

Figure 5:
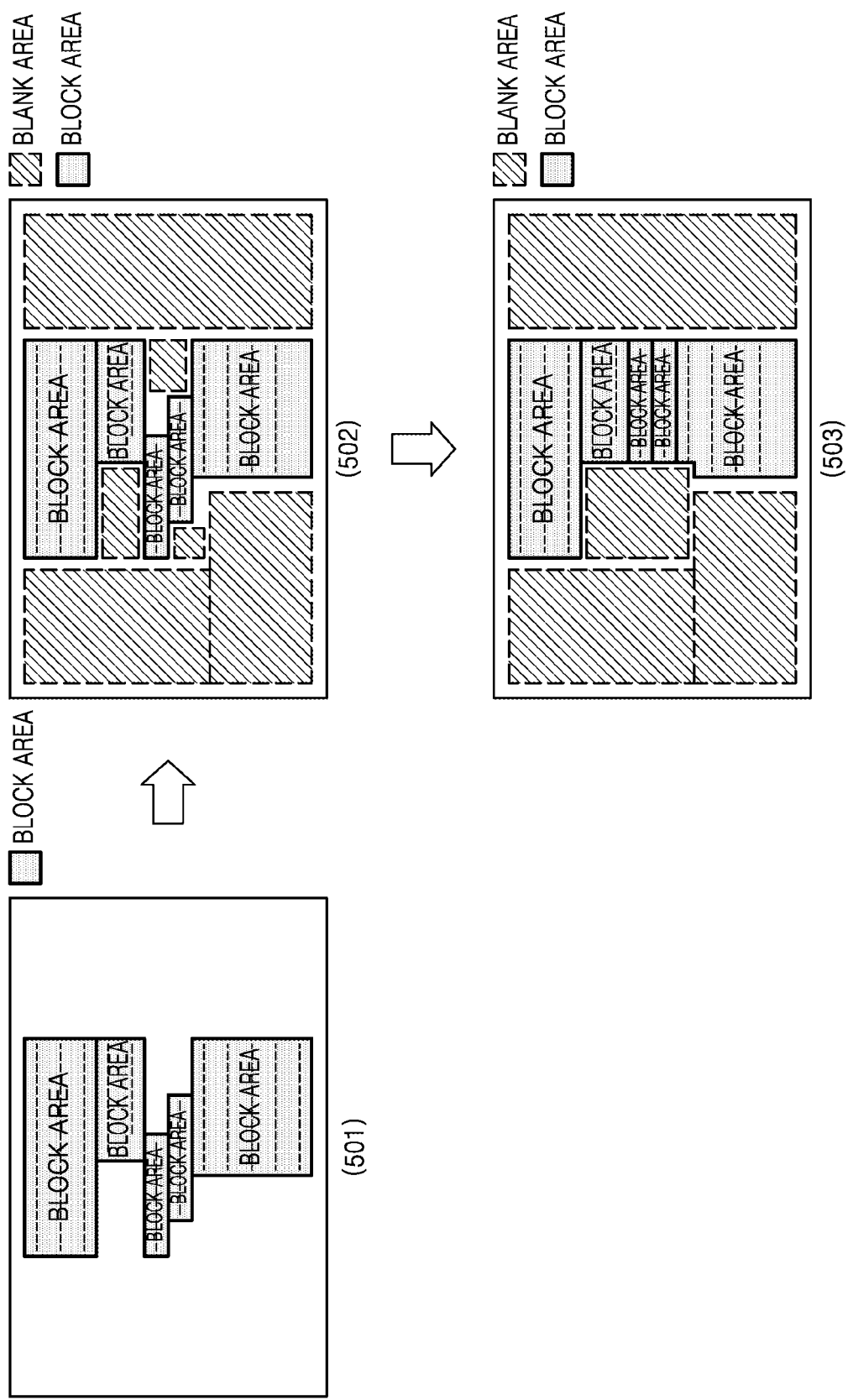
FIG. 5 is a diagram showing an example of detecting a block area detected on a web page by an apparatus according to an embodiment of the present disclosure and a blank area.

FIG. 5 is a diagram showing another example of detecting a blank area and a block area detected on a web page by the apparatus 100 according to an embodiment of the present disclosure. In operations 501 and 502 of FIG. 5, the apparatus 100 may detect a block area and a blank area as in operations 401 and 402 of FIG. 4 described above. In operation 503 of FIG. 5, the apparatus 100 may combine a plurality of blank areas (or blank pieces) smaller than that of pre-set size information to create one blank area. Since the plurality of blank areas are separated from one another in operation 502 of FIG. 5, the apparatus 100 may combine the plurality of blank areas while rearranging block areas around the plurality of blank areas.

Figure 6:
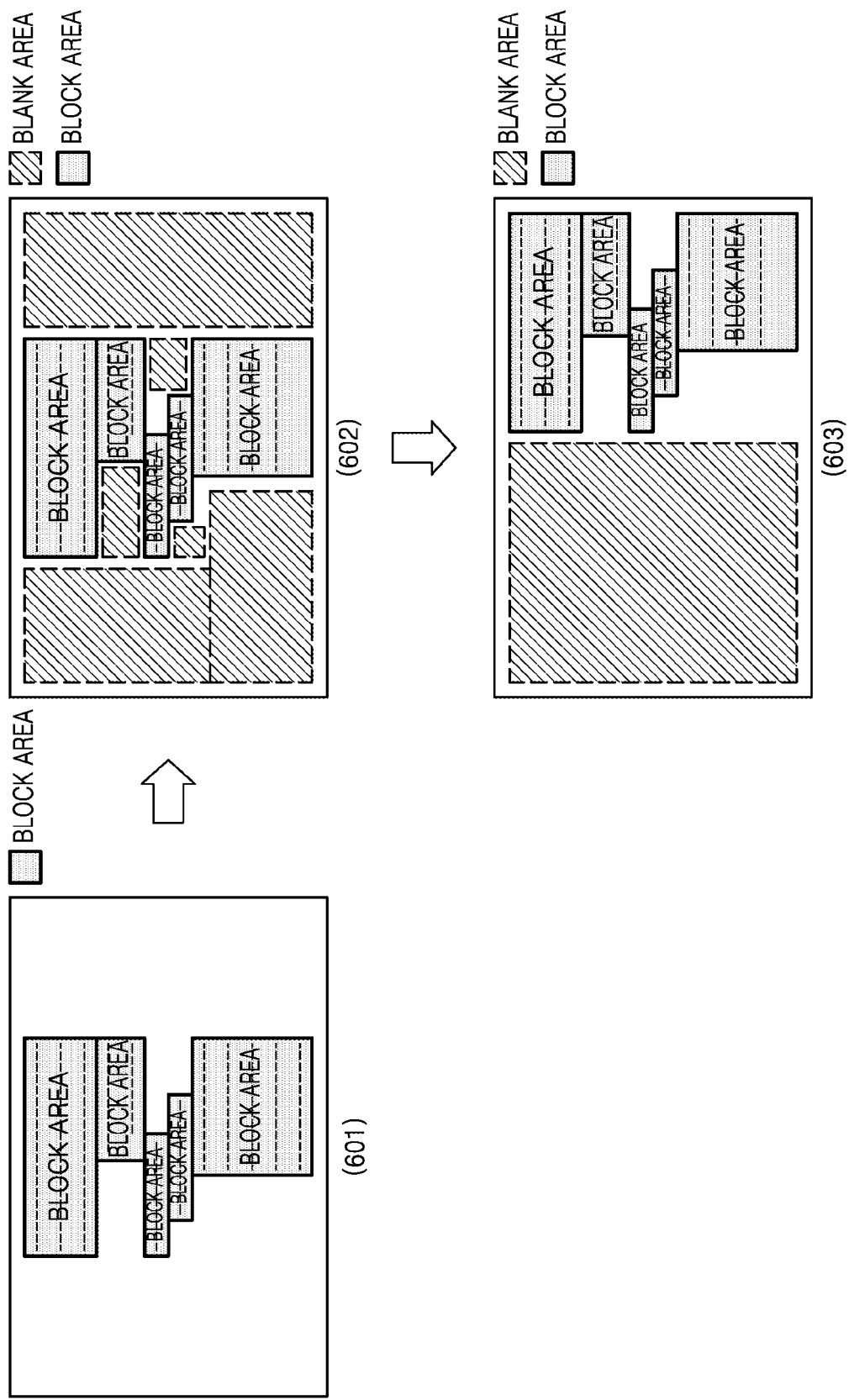
FIG. 6 is a diagram showing an example of detecting a block area detected on a web page by an apparatus according to an embodiment of the present disclosure and a blank area.

FIG. 6 is a diagram showing another example of detecting a blank area and a block area detected on a web page by the apparatus 100 according to an embodiment of the present disclosure. In operations 601 and 602 of FIG. 6, the apparatus 100 may detect a block area and a blank area as in operations 401 and 402 of FIG. 4 described above. In operation 603 of FIG. 6, in order to create a blank area for providing target data having a large size, the apparatus 100 may rearrange block areas of the web page and combine all blank areas, thereby creating one blank area. Although FIG. 6 shows a case in which one blank area is created in the left portion of the web page. The apparatus 100 may create one blank area in the right portion, the upper portion, or the lower portion of the web page. A location of such a blank area may be set according to a user input or may be pre-set to the apparatus 100.

Figure 7:
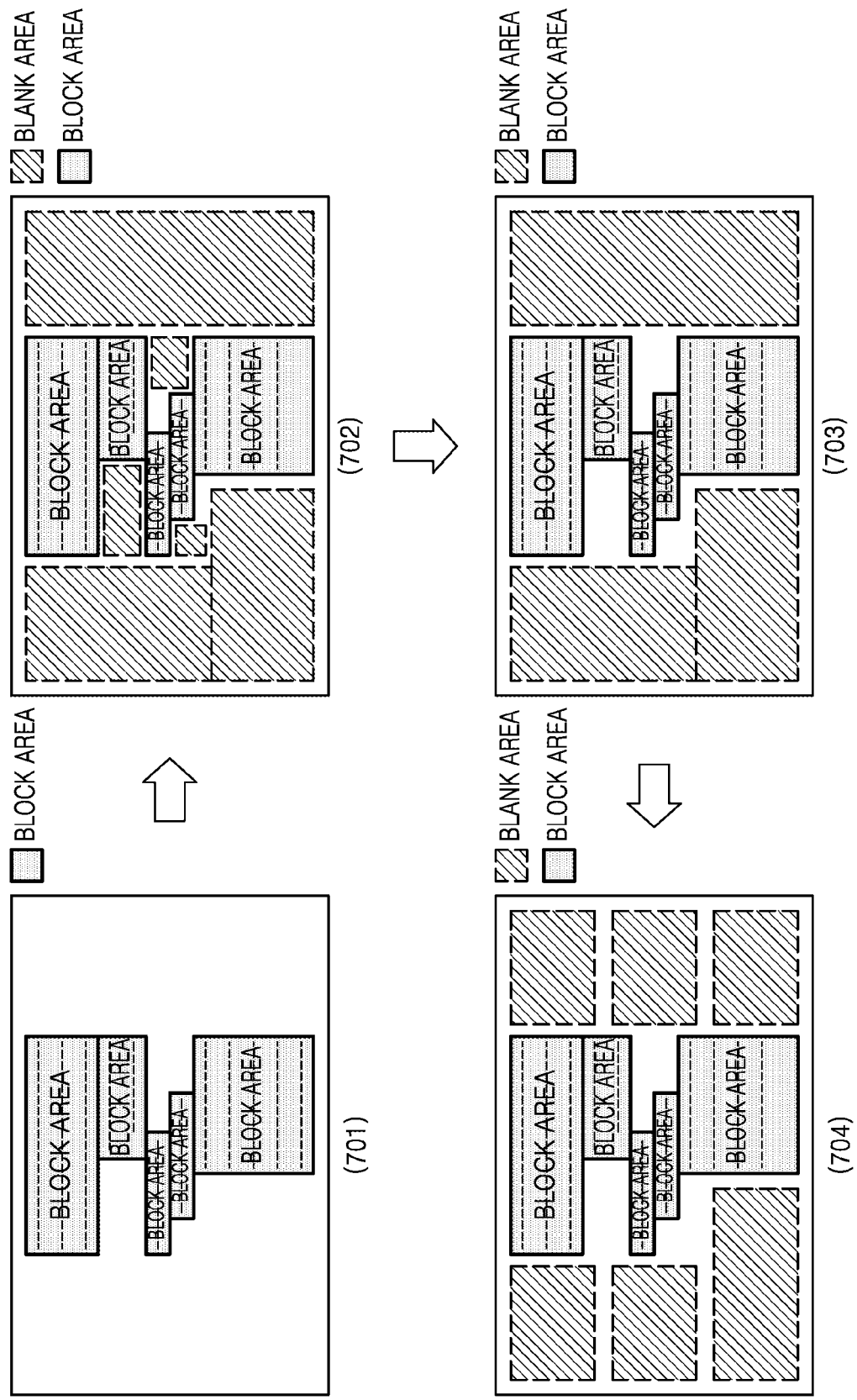
FIG. 7 is a diagram showing an example of detecting a block area detected on a web page by an apparatus according to an embodiment of the present disclosure and a blank area.

FIG. 7 is a diagram showing another example of detecting a blank area and a block area detected on a web page by the apparatus 100 of an embodiment of the present disclosure. In operations 701, 702, and 703 of FIG. 7, the apparatus 100 may detect block areas and blank areas as in operations 401, 402, and 403 of FIG. 4 described above. In operation 704 of FIG. 7, the apparatus 100 may divide some blank areas into smaller blank areas. The apparatus 100 may split a blank area according to a size of target data when there is no target data that matches the size of the blank area.

Figure 8:
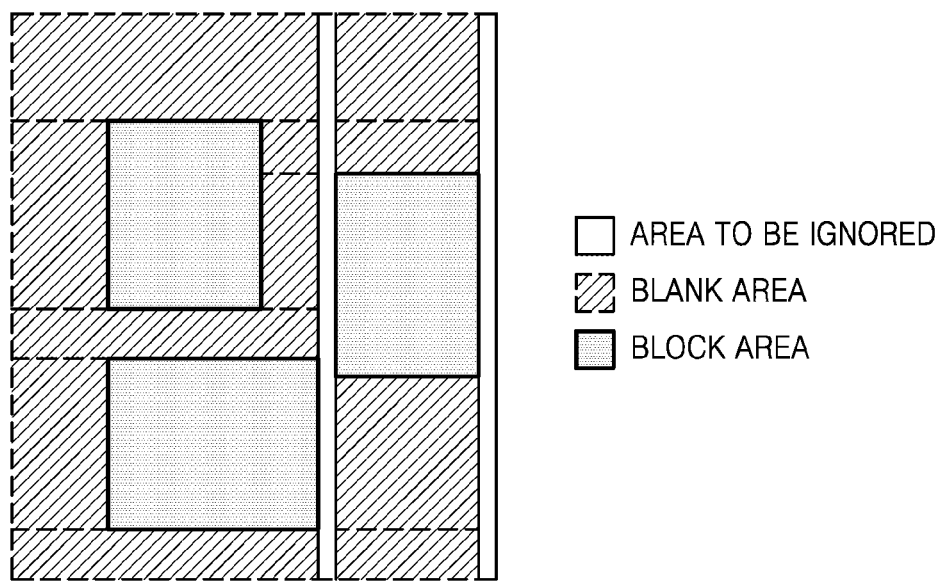
FIG. 8 is a diagram showing an example that a block area, a blank area, and an area to be ignored are detected in a web page by an apparatus according to an embodiment of the present disclosure.

FIG. 8 is a diagram showing an example that a block area, a blank area, and an area to be ignored are detected in a web page by the apparatus 100 according to an embodiment of the present disclosure. Although the area to be ignored shown in FIG. 8 has not been described above with reference to FIGS. 4 through 7, areas other than block areas and blank areas may also be considered as areas to be ignored in FIGS. 4 through 7.

FIG. 9 is a diagram showing an example of reducing a size of a block area included in a web page and enlarging a detected blank area, by the apparatus 100 according to an embodiment of the present disclosure. When a block area and a blank area are detected in operation 901 as shown in FIG. 9, in operations 902, the apparatus 100 may reduce displayed sizes of valid components included in the web page according to specified scale rates and detect at least one blank area.

When a blank area is enlarged in operation 902 as shown in FIG. 9, as a turn-off button regarding the blank area is manipulated, the apparatus 100 may restore sizes of block areas of the web page to original sizes. When sizes of block areas of a web page are restored to original sizes, the apparatus 100 may reduce a size of the blank area or make the blank area disappear.

Furthermore, the apparatus 100 may quickly adjust a size of a valid block area and a size of a blank area included in a web page shown in FIG. 9 according to a scale rate of the web page, which is controlled by using a shortcut key like a mouse wheel.

Meanwhile, in operation S202 of FIG. 2, the apparatus 100 may detect target data. The apparatus 100 may detect target data having a size matching size information regarding the detected blank area. When a plurality of pieces of target data having a size matching the size information regarding the blank area are detected, the apparatus 100 may push the plurality of pieces of target data sequentially by a certain time unit in the blank area. When a plurality of pieces of target data having a size matching the size information regarding the blank area are detected, the apparatus 100 may select a piece of target data according to a priority order and push the target data to the blank area. The priority order may be determined according to an order in which keywords are detected recently. The priority order may be determined according to a value-added service type set by a user. The priority order according to the present disclosure are not limited thereto.

When target data type (or value-added service type) is set by a user, in operation S202, the apparatus 100 may detect target data having a size matching the size information regarding the blank area from among pieces of target data belonging to the set target data type.

In order to detect target data, the apparatus 100 may set a target data type according to a user input. To this end, the apparatus 100 may guide or provide a user with a menu for setting a target data type. For example, when target data includes various value-added services as described above and an AD is selected via a provided menu, the apparatus 100 may provide the AD as target data via the blank area. For example, when user-self-defined data is selected via the above-stated menu, the apparatus 100 may provide the user-self-defined data as target data via a blank area.

When a plurality of pieces of target data having a size matching the size information regarding the blank area are detected, the apparatus 100 may limit target data to be provided according to the number of pieces of allowed target data. The number of pieces of allowed target data may be pre-set to the apparatus 100. The number of pieces of allowed target data may be set by a user.

When a plurality of pieces of target data having a size matching the size information regarding the blank area are detected, the apparatus 100 provides guidance information to a user, such that target data to be provided via the blank area may be selected from among the plurality of pieces of target data.

In operation S203, the apparatus 100 pushes target data to the blank area and display a web page and the target data together. After the target data is displayed, the apparatus 100 may perform an operation based on the target data according to a user input received via an input device (e.g., a remote controller, a touch, a mouse, a keyboard, etc.).

For example, the apparatus 100 may perform an operation according to a click input on target data. The operation of the apparatus 100 may include, for example, focusing target data, browsing more information, opening a URL associated with target data, and/or playing back target data (e.g., a video, a flash, etc.), etc. Operations of the apparatus 100 according to the present disclosure are not limited thereto. For example, operations of the apparatus 100 may further include closing/hiding target data, replaying target data, updating target data, stopping target data, and/or pausing target data, etc.

Figure 10:
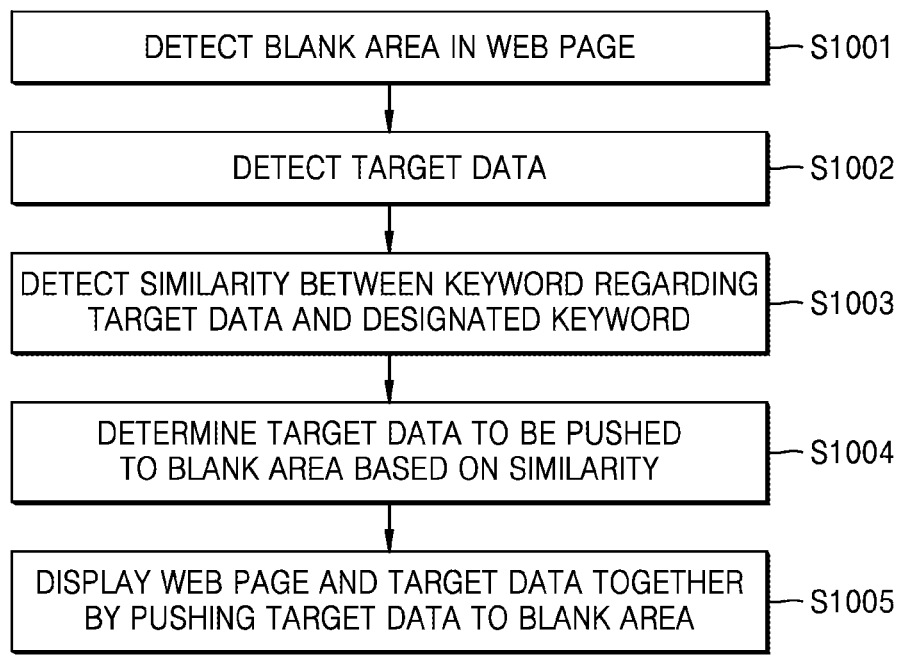
FIG. 10 is a diagram showing another example of the method of providing information by an apparatus according to an embodiment of the present disclosure.

FIG. 10 is a diagram showing another example of the method of providing information by the apparatus 100 according to an embodiment of the present disclosure. Since operations S1001, S1002, and S1005 of FIG. 10 are similar to operations S201, S202, and S203 of FIG. 2, detailed description thereof will be omitted to avoid redundant descriptions.

In operation S1003, when at least one piece of target data having a size matching size information regarding a blank area is detected, the apparatus 100 may detect a similarity between a keyword regarding the blank area and/or a personal keyword and keywords regarding a plurality of pieces of target data.

In other words, the apparatus 100 may determine whether the keyword regarding the target data having a size matching the size information regarding the blank area matches the personal keyword. When it is determined that the keyword regarding the target data matches the personal keyword, the apparatus 100 may obtain a personal keyword matching coefficient A. However, when it is determined that the keyword regarding the target data does not match the personal keyword, the apparatus 100 may set the above-stated personal keyword matching coefficient A to 0.

The apparatus 100 may determine whether the keyword regarding the blank area matches the keyword regarding the detected target data. When it is determined that the keyword regarding the target data matches the keyword regarding the blank area, the apparatus 100 may obtain a keyword matching coefficient B regarding the blank area. However, when it is determined that the keyword regarding the target data does not match the keyword regarding the blank area, the apparatus 100 may set the keyword matching coefficient B to 0 as described above.

The apparatus 100 may obtain a keyword similarity regarding the target data by applying the personal keyword matching coefficient A and the keyword matching coefficient B regarding the blank area to an equation $P=A*(1-x)+Bx$. In the above-stated equation, P denotes a similarity between a keyword regarding target data having a size matching a size of the blank area and a designated keyword. X denotes a predetermined matching percentage. The predetermined matching percentage may be specified by a user or pre-set to the apparatus 100. The predetermined matching percentage X may be set to 50, for example.

In operation S1004, when there is one piece of target data having a size matching the size of the blank area and the similarity between a keyword regarding the target data obtained in operation S1003 and a designated keyword is low, the apparatus 100 may determine the target data having a size matching the size of the blank area as the target data to be pushed to the blank area.

When there is one piece of target data having a size matching the size of the blank area and the similarity between a keyword regarding the target data obtained in operation S1003 and a designated keyword is low, in operation S1004, the apparatus 100 may not determine the target data having a size matching the size of the blank area as target data to be pushed to the blank area. In this case, the apparatus 100 may not provide target data via the blank area.

When a plurality of pieces of target data having a size matching the size of the blank area are detected, in operation S1004, the apparatus 100 may determine target data having a highest similarity detected from among the plurality of pieces of target data according to the above-stated equation as target data to be pushed to the blank area. Therefore, the apparatus 100 may provide data highly relevant to a user and/or data highly relevant to content included in a web page via the blank area. As a result, a user may experience more information regarding a field of interest of the user or a field related to a web page.

When a plurality of pieces of target data having a size matching the size of the blank area are detected, in operation S1004, the apparatus 100 may determine target data having a lowest similarity from among the plurality of pieces of target data detected according to the above-stated equation as target data to be pushed to the blank area. Therefore, the apparatus 100 may provide data irrelevant to a user and/or data irrelevant to content included in a web page via the blank area. As a result, a user may experience information regarding a new field.

When a plurality of pieces of target data having a size matching the size of the blank area are detected, in operation S1004, the apparatus 100 may determine an order of providing target data to be pushed to the blank area based on a similarity detected according to the above-stated equation. For example, the apparatus 100 may determine an order of providing target data to be pushed to the blank area in the order of high similarity or low similarity.

When a plurality of pieces of target data having a size matching the size of the blank area are detected, in operation S1005, the apparatus 100 may sequentially push the plurality of pieces of data to the blank area by a certain time unit in the order of high similarity or low similarity between keywords regarding target data detected according to the above-stated equation and a designated keyword.

In addition to the flowcharts shown in FIGS. 2 and 10, a method of providing information according to another embodiment of the present disclosure may further include monitoring an activity of a web page (e.g., a web page browsing, a web page operation, a web page opening, or a web page closing, etc.) and/or a user's activity (e.g., a target data click, a target data browsing, a target data updating, etc.) regarding target data and giving different incentives to a user based on a result of the monitoring.

For example, the apparatus 100 may perform a method of monitoring an activity of a web page and a user's operation regarding target data (e.g., counting the number of pieces of visited target data, a target data browsing time, etc.) by using a timer and a counter and applying various rebate policies according to results of the monitoring (e.g., popularity of target data, personal preferences, etc.). In order to apply the above-state various rebate policies, the apparatus 100 may provide the above-described monitoring results to at least one external device connected to the apparatus 100, receive a rebate result from the external device, and provide the rebate result to a user.

Figure 11:
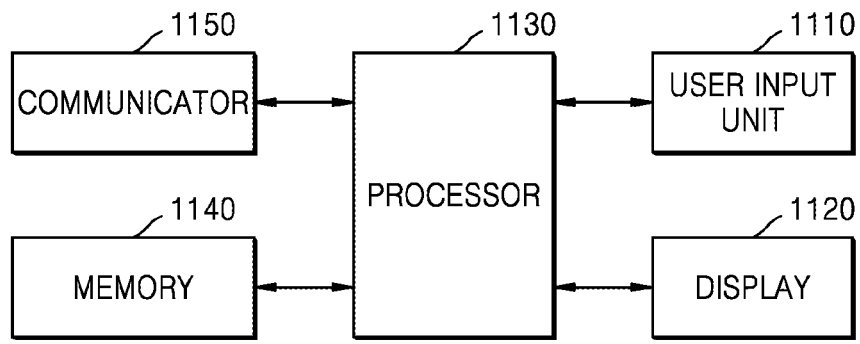
FIG. 11 is a functional block diagram of an information providing apparatus according to an embodiment of the present disclosure.

FIG. 11 is a functional block diagram of an information providing apparatus 100 according to an embodiment of the present disclosure. Referring to FIG. 11, the information providing apparatus 100 includes a user input unit 1110, a display 1120, a processor 1130, a memory 1140, and a communicator 1150.

The user input unit 1110 may receive a user input for the apparatus 100. The user input unit 1110 may receive a user input based on an input device, such as a remote control, a mouse, a keyboard, and/or a touch device. User inputs that may be received according to the present disclosure may include, for example, type information regarding the target data, personal keywords, minimum size information regarding a blank area, the number of blank areas, a user input based on guidance information provided by the apparatus 100, but are not limited thereto.

The display 1120 may be controlled by the processor 1130 and display a web page as shown in FIGS. 4 through 9. The display 1120 may be a liquid crystal display, a thin film transistor-liquid crystal display, an organic light-emitting diode display, a flexible display, a three-dimensional display, an electrophoretic display (EPD), or a transparent display. The display 1120 may include, for example, a touch screen, but the present disclosure does not limit the configuration of the display 1120 to those described above.

The processor 1130 may be referred to as a controller for controlling all functions of the apparatus 100. The processor 1130 may perform a web browser function according to a user input received via the user input unit 1110 and download web resources of a web page and, as described above with reference to FIGS. 1 through 10, may detect valid components included in the web page, detect block areas, detect a blank area, and push target data to the detected blank area, thereby displaying the web page and the target data together via the display 1120.

When information regarding a web site is received through the user input unit 1110, the communicator 1150 requests web resources of the web page from the server 110 and receives the web resources of the web page from the server 110.

The communicator 1150 includes one or more components for communication between the apparatus 100 and at least one external device (e.g., a web site server, a device or a server storing information related to target data, etc.). For example, the communicator 1150 may include at least one of a short-range communicator, a mobile communicator, and a broadcast receiver, but components that are included in the communicator 1150 are not limited thereto.

A short-range wireless communicator may include a Bluetooth communication module, a Bluetooth low energy (BLE) communication module, a near-field communication unit (RFID) module, a WLAN (Wi-Fi) communication module, a ZigBee communication module, an Ant+communication module, a Wi-Fi Direct (WFD) communication module, a beacon communication module, an ultra wideband (UWB) communication module, and/or an infrared data association (IrDA) communication module.

The mobile communicator may transmit/receive a radio signal to/from at least one of a base station, an external device, and a server on a mobile communication network. Here, the wireless signal may include a voice call signal, a video call signal, or various types of data associated with transmission and reception of text/multimedia messages.

The broadcast receiver may receive broadcast signals and/or broadcast-related information from outside via a broadcast channel. The broadcast channel may include, but is not limited to, at least one of a satellite channel, a terrestrial channel, and a radio channel.

The memory 1140 may store an application program capable of performing a web browser function, information necessary for detecting a blank area, information necessary for detecting target data, and all data related to target data. The memory 1140 may store an application program for performing the method of providing information shown in the flowchart shown in FIG. 2, FIG. 3, or FIG. 10. The memory 1140 may read necessary data and provide the data to the processor 1130 in response to a request from the processor 1130. The memory 1140 may store received data according to a request of the processor 1130.

The memory 1140 may include an embedded memory and/or an external memory. The memory 1140 may include a volatile memory, such as DRAM, SRAM, or SDRAM, a non-volatile memory, such as an one time programmable ROM (OTPROM), PROM, EPROM, EEPROM, mask ROM, flash ROM, or a NAND flash memory, an SSD, a flash drive, such as a compact flash (CF) card, an SD card, a Micro-SD card, a Mini-SD card, an Xd card, or a memory stick, or a storage device, such as a HDD. The above-described methods of the present disclosure may be implemented by a computer program. For example, the above-described method may be performed by web browser application software installed on the apparatus 100. The computer program described above may be operated in an operating system environment installed on the apparatus 100. The apparatus 100 may write the above-described computer program onto a storage medium and use the above-described computer program by reading the same from the storage medium.

One or more exemplary embodiments of the present disclosure may be implemented by a computer-readable recording medium including computer-executable commands, such as a program module executed by a computer. The computer-readable recording medium may be an arbitrary available medium accessible by a computer, and examples thereof include all volatile media (e.g., RAM) and non-volatile media (e.g., ROM) and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable command, a data structure, a program module, other data of a modulated data signal, such as a carrier wave, or another transmission mechanism, and an example thereof includes an arbitrary information transmission medium.

The foregoing description of the present disclosure has been presented for the purposes of illustration and description. It is apparent to a person having ordinary skill in the art to which the present disclosure relates that the present disclosure can be easily modified into other detailed forms without changing the technical principle or essential features of the present disclosure. Therefore, the foregoing embodiments should be regarded as illustrative rather than limiting in all aspects. In an example, each component which has been described as a unitary part can be implemented as distributed parts. Similarly, each component which has been described as distributed parts can also be implemented as a combined part.

The scope of the present disclosure is indicated by the claims which will be described in the following rather than the detailed description of the exemplary embodiments, and it should be understood that the claims and all modifications or modified forms drawn from the concept of the claims are included in the scope of the present disclosure.

The invention claimed is:

1. An information providing apparatus comprising:
    a display configured to display a web page; and
    a processor configured to:
        obtain web resources of a web page,
        parse the obtained web resources of the web page,
        lay out each component included in the web page by using a parsed result,
        obtain position information and size information regarding each component included in the web page,
        detect at least one blank area included in the web page according to layout information regarding each component included in the web page,
        based on the detected at least one blank area not having a size for providing device-executable function data, combine a plurality of blank areas with one another by rearranging valid components or block areas included in the web page or enlarge one of the at least one detected blank area,
        identify whether target data has a size that matches size information regarding the one of the at least one blank area,
        based on identifying that the target data has the size that matches the size information regarding the one of the at least one blank area:
            identify whether the target data is appropriate for the one of the at least one blank area based on a similarity between a keyword regarding the target data and a keyword adjacent to the at least one blank area, and based on identifying that the target data is appropriate for the one of the at least one blank area, push the target data to the one of the at least one blank area.

2. The information providing apparatus of claim 1, wherein
the keyword adjacent to the at least one blank area is based on a keyword of a valid component or a block area, which is included in the web page and that is adjacent to the one of the at least one blank area.

3. The information providing apparatus of claim 1, wherein the processor is further configured to detect at least one valid component included in the web page by using the layout information regarding each component included in the web page, identify at least one block area based on boundary lines of the at least one valid component, and detect areas of the web page other than the at least one block area as the at least one blank area.

4. The information providing apparatus of claim 3, wherein the processor is further configured to detect an operation component, a text component, and a picture component included in the web page as first valid components, detect valid components other than a valid component covered by another valid component among the first valid components as second valid components, detect valid components other than a repeated picture component, a picture component including invalid information, and a picture component having a background attribute among the second valid components as third valid components, and detect the third valid components as the at least one valid component included in the web page.

5. The information providing apparatus of claim 1, wherein the processor is further configured to exclude blank areas that are smaller than a predetermined size from the detected at least one blank area after the at least one blank area is detected.

6. The information providing apparatus of claim 1, wherein the processor is further configured to combine a plurality of blank areas having sizes smaller than a predetermined size after the at least one blank area is detected.

7. The information providing apparatus of claim 1, wherein, based on a plurality of blank areas being detected, the processor is further configured to rearrange the valid components or the block areas included in the web page so as to combine the plurality of blank areas.

8. The information providing apparatus of claim 1, wherein the processor is further configured to reduce sizes of the valid components or sizes of the block areas included in the web page according to designated scale rates.

9. The information providing apparatus of claim 1, wherein the keyword adjacent to the at least blank area is a keyword regarding a component included in the webpage that is adjacent to the at least one blank area or a keyword of a block area adjacent to the at least one blank area.

10. A method by which an apparatus comprising a display provides information, the method comprising:
obtaining web resources of a web page;
parsing the obtained web resources of the web page;
laying out each component included in the web page by using a parsed result;
obtaining position information and size information regarding each component included in the web page;
detecting at least one blank area included in the web page according to layout information regarding each component included in the web page;
based on the detected at least one blank area not having a size for providing device-executable function data, combining a plurality of blank areas with one another by rearranging valid components or block areas included in the web page or enlarge one of the at least one detected blank area;
identifying whether target data has a size that matches size information regarding the one of the at least one blank area; and
based on identifying that the target data has the size that matches the size information regarding the one of the at least one blank area:
identifying whether the target data is appropriate for the one of the at least one blank area based on a similarity between a keyword regarding the target data and a keyword adjacent to the at least one blank area; and
based on identifying that the target data is appropriate for the one of the at least one blank area, pushing the target data to the one of the at least one blank area.

11. The method of claim 10, wherein
the keyword adjacent to the at least one blank area is based on a valid component or a block area, which is included in the web page and that is adjacent to the one of the at least one blank area.

12. The method of claim 10, wherein the detecting of the at least one blank area comprises:
detecting at least one valid component included in the web page by using the layout information regarding each component included in the web page;
identifying at least one block area based on boundary lines of the at least one valid component; and
detecting areas of the web page other than the at least one block area as the at least one blank area.

13. The method of claim 12, wherein the detecting of the at least one valid component comprises:
detecting an operation component, a text component, and a picture component included in the web page as first valid components;
detecting valid components other than a valid component covered by another valid component among the first valid components as second valid components;
detecting valid components other than a repeated picture component, a picture component including invalid information, and a picture component having a background attribute among the second valid components as third valid components; and
detecting the third valid components as the at least one valid component included in the web page.

14. A non-transitory computer-readable recording medium having recorded thereon s-computer program code, which, when executed by a computer, causes the computer to implement the method of claim 10.

* * * * *